(12) United States Patent
Braun et al.

(10) Patent No.: US 7,612,152 B2
(45) Date of Patent: Nov. 3, 2009

(54) SELF-HEALING POLYMERS

(75) Inventors: Paul V. Braun, Savoy, IL (US); Soo Hyoun Cho, Champaign, IL (US); Scott R. White, Champaign, IL (US); Nancy R. Sottos, Champaign, IL (US); H. Magnus Andersson, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 590 days.

(21) Appl. No.: 11/123,859

(22) Filed: May 6, 2005

(65) Prior Publication Data

US 2006/0252852 A1 Nov. 9, 2006

(51) Int. Cl.
*C08L 63/00* (2006.01)
(52) U.S. Cl. .................... 525/476; 523/211
(58) Field of Classification Search ................ 525/476; 523/211
See application file for complete search history.

(56) References Cited

U.S. PATENT DOCUMENTS

| | | | |
|---|---|---|---|
| 3,041,289 A | 6/1962 | Katchen et al. | |
| 3,069,370 A | 12/1962 | Jensen et al. | |
| 3,868,199 A | 2/1975 | Fera | |
| 4,080,238 A * | 3/1978 | Wolinski et al. | 156/305 |
| 4,301,306 A | 11/1981 | Layer | |
| 4,324,717 A | 4/1982 | Layer | |
| 4,380,617 A | 4/1983 | Minchak et al. | |
| 4,389,496 A | 6/1983 | Leüsner et al. | |
| 4,461,854 A * | 7/1984 | Smith | 523/211 |
| 4,708,969 A | 11/1987 | Leach | |
| 4,755,588 A | 7/1988 | Vallance et al. | |
| 4,758,400 A | 7/1988 | Dunnavant et al. | |
| 4,804,427 A | 2/1989 | Paul et al. | |
| 4,853,434 A * | 8/1989 | Block | 525/100 |
| 4,902,560 A | 2/1990 | Silver | |
| 4,940,645 A | 7/1990 | Davis et al. | |
| 4,943,621 A | 7/1990 | Janda et al. | |
| 5,063,103 A | 11/1991 | Sugawara et al. | |
| 5,185,108 A | 2/1993 | Shimandle | |
| 5,312,940 A | 5/1994 | Grubbs et al. | |
| 5,324,616 A | 6/1994 | Sacripante et al. | |
| 5,342,909 A | 8/1994 | Grubbs et al. | |
| 5,413,924 A | 5/1995 | Kosak et al. | |
| 5,427,880 A | 6/1995 | Tamura et al. | |
| 5,504,176 A * | 4/1996 | Fujiki | 528/18 |
| 5,550,044 A | 8/1996 | Kosak et al. | |
| 5,561,173 A | 10/1996 | Dry | |
| 5,575,841 A | 11/1996 | Dry | |
| 5,643,764 A | 7/1997 | Kosak et al. | |
| 5,660,624 A | 8/1997 | Dry | |
| 5,789,494 A | 8/1998 | Hand et al. | |
| 5,801,033 A | 9/1998 | Hubbell et al. | |
| 5,803,963 A | 9/1998 | Dry | |
| 5,840,238 A | 11/1998 | Setiabudi et al. | |
| 5,958,325 A | 9/1999 | Seemann, III et al. | |
| 5,989,334 A | 11/1999 | Dry | |
| 6,001,909 A | 12/1999 | Setiabudi | |
| 6,040,363 A | 3/2000 | Warner et al. | |
| 6,048,488 A | 4/2000 | Fink et al. | |
| 6,075,072 A | 6/2000 | Guilbert et al. | |
| 6,100,323 A | 8/2000 | Setiabudi et al. | |
| 6,113,728 A * | 9/2000 | Tsukagoshi et al. | 156/264 |
| 6,224,793 B1 * | 5/2001 | Hoffman et al. | 264/4.1 |
| 6,235,856 B1 | 5/2001 | Hafner et al. | |
| 6,258,870 B1 | 7/2001 | Hubbell et al. | |
| 6,261,360 B1 | 7/2001 | Dry | |
| 6,287,992 B1 | 9/2001 | Polansky et al. | |
| 6,316,194 B1 | 11/2001 | Karn et al. | |
| 6,388,865 B1 | 5/2002 | Honda et al. | |
| 6,479,167 B2 * | 11/2002 | Sumita et al. | 428/620 |
| 6,518,330 B2 | 2/2003 | White et al. | |
| 6,527,849 B2 | 3/2003 | Dry | |
| 6,669,961 B2 | 12/2003 | Kim et al. | |
| 6,808,461 B2 | 10/2004 | Harris et al. | |
| 6,858,659 B2 | 2/2005 | White et al. | |
| 7,022,179 B1 | 4/2006 | Dry | |
| 7,045,562 B2 | 5/2006 | Thiel | |
| 7,192,993 B1 | 3/2007 | Sarangapani et al. | |
| 7,276,252 B2 | 10/2007 | Payumo et al. | |

(Continued)

FOREIGN PATENT DOCUMENTS

DE 1590958 5/1970

(Continued)

OTHER PUBLICATIONS

International Search Report dated Aug. 1, 2006 for PCT application No. PCT/US2006/015703.

(Continued)

*Primary Examiner*—Kuo-Liang Peng
(74) *Attorney, Agent, or Firm*—Blanchard & Associates

(57) ABSTRACT

A composite material includes a polymer matrix, a polymerizer, and a plurality of capsules containing a corresponding activator for the polymerizer. The composite material can also include an adhesion promoter, and the polymerizer can be phase separated from the polymer matrix. The composite material can be made by dispersing the polymerizer and capsules into the polymer matrix. These composite materials can exhibit improved environmental stability, and can be used with a wider variety of activators.

28 Claims, 3 Drawing Sheets

U.S. PATENT DOCUMENTS

| | | |
|---|---|---|
| 2002/0007959 A1 | 1/2002 | Kaltenborn et al. |
| 2002/0111434 A1 | 8/2002 | White et al. |
| 2004/0007784 A1 | 1/2004 | Skipor et al. |
| 2004/0055686 A1 | 3/2004 | Cowger et al. |
| 2005/0038173 A1 | 2/2005 | Harris et al. |
| 2005/0085564 A1 | 4/2005 | Thiel |
| 2005/0250878 A1 | 11/2005 | Moore et al. |
| 2006/0111469 A1 | 5/2006 | White et al. |
| 2006/0252852 A1 | 11/2006 | Braun et al. |
| 2006/0281834 A1 | 12/2006 | Lee et al. |
| 2007/0166542 A1 | 7/2007 | Braun et al. |
| 2007/0282059 A1 | 12/2007 | Keller et al. |

FOREIGN PATENT DOCUMENTS

| | | |
|---|---|---|
| DE | 42 09 031 | 9/1993 |
| DE | 10157123 | 1/2003 |
| EP | 0020123 | 12/1980 |
| EP | 0287288 | 10/1988 |
| EP | 0 349 855 | 1/1990 |
| EP | 0 424 833 | 5/1991 |
| EP | 0 669 368 | 8/1995 |
| EP | 0985737 | 3/2000 |
| EP | 1168372 | 1/2002 |
| WO | WO 90/00005 | 1/1990 |
| WO | WO 93/20111 | 10/1993 |
| WO | WO 96/16100 | 5/1996 |
| WO | WO 96/20235 | 7/1996 |
| WO | WO 97/25360 | 7/1997 |
| WO | WO 99/47704 | 9/1999 |
| WO | WO 99/55753 | 11/1999 |
| WO | WO 99/55794 | 11/1999 |
| WO | WO 02/064653 | 8/2002 |
| WO | WO 2004/035644 | 4/2004 |
| WO | WO 2005/118703 | 12/2005 |
| WO | WO 2007/009280 | 1/2007 |
| WO | WO 2007/082153 | 7/2007 |
| WO | WO2007/082153 | 7/2007 |
| WO | WO2007/143475 | 12/2007 |

OTHER PUBLICATIONS

Stevens, M.P., Polymer Chemistry, p. 184-186, 1999.
Stevens, M.P. Polymer Chemistry, p. 378-381, 1999.
Dry, C., et al., "Three part methylmethacrylate adhesive system as an internal delivery system for smart responsive concrete", Smart Mater. Struct., 5, p. 297-300, 1996.
Dry, C. "Matrix cracking repair and filling using active and passive modes for smart time release of chemicals from fibers into cement matrices", Smart Mater. Struct., 3, p. 118-123, 1994.
Dry, C., "Procedures developed for self-repair of polymer matrix composite materials", Composite Structures, 35, p. 263-269, 1996.
Dry, C. et al., "Passive smart self-repair in polymer matrix composite materials", SPIE, vol. 1916, p. 438-444, 1993.
D. Jung, et al., "Self-healing composites using embedded microspheres", K. Jacob, N. Katsube and W. Jones, ed., vol. MD-80, The American Society for Mechanical Engineers (ASME), 265-275 (1997).
Beckwith, et al., "Resin Transfer Molding: A Decade of Technology Advances", SAMPE Journal, vol. 34, No. 6, p. 7-19, 1998.
Grubbs, R.H., et al., "Recent Advances in Olefin Metathesis and Its Application in Organic Synthesis", Tetrahedron 54, p. 4413-4450, 1998.
Dias, E.L., et al., "Well-Defined Ruthenium Olefin Metathesis Catalyst: Mechanism and Activity", J. Am. Chem. Soc., 119, p. 3887-3897, 1997.
Breslow, D.S., "Metathesis Polymerization", Prog. Polym. Sci. vol. 18, p. 1141-1195, 1993.
Dias, E.L., et al., "Synthesis and Investigation of Homo- and Heterobimetallic Ruthenium Olefin Metathesis Catalysts Exhibiting Increased Activities", Organometallics, 17, p. 2758-2767, 1998.
Weck, M., et al., "Synthesis of Discotic Columnar Side-Chain Liquid Crystalline Polymers by Ring-Opening Metathesis Polymerization (ROMP)", Macromolecules, 30, p. 6430-6437, 1997.
Fraser, C., et al., "Synthesis of Glycopolymers of Controlled Molecular Weight by Ring-Opening Metathesis Polymerization Using Well-Defined Functional Group Tolerant Ruthenium Carbene Catalysts", Macromolecules, 28, p. 7248-7255, 1995.
Bazan, G.C., et al., "Polymerization of Functionalized Norbornenes Employing Mo (CH-t-Bu) (NAr) (O-t-Bu)$_2$ as the Initiator", Macromolecules, 24, p. 4495-4502, 1991.
Li, Victor C., et al., "Feasibility Study of a Passive Smart Self-healing cementitious composite.", Composites Part B, 29B, p. 819-827, 1998.
International Search Report dated Oct. 4, 2002 for Application No. PCT/US02/04163.
White, S.R., "Autonomic healing of polymer composites", Nature, p. 794-797, 2001.
Dean, K., "Near-Infrared and Rheological Investigations of Epoxy-Vinyl Ester Interpenetrating Polymer Networks", Macromolecules, p. 6623-6630, 2001.
Wool, Richard P., "A material fix", Nature, vol. 409, p. 773-774.
EPON, Resin 160 Epoxy Novolac Resin, Product Bulletin, p. 1-3, 1998.
D. Jung, et al., "Self-healing composites using embedded microspheres", K. Jacob, N. Katsube and W. Jones, ed., vol. MD-80, in Proceedings of the ASME International Mechanical Engineering Conference and Exposition, 265-275 (1997).
Cook, D.C., "Spectroscopic identification of protective and non-protective corrosion coatings on steel structures in marine environments", Corrosion Science, vol. 47, pp. 2550-2570, (2005).
Wessling, B., "Scientific engineering of anti-corrosion coating systems based on organic metals (polyaniline)", Journal of Corrosion Science and Engineering, vol. 1, paper 15, 19 pages, found at www.jcse.org, ISSN 1466-8858, (1999).
Cho, S.H., et al., "Polydimethylsiloxane-based self-healing materials", Advanced Materials, vol. 18, issue 8, pp. 997-1000, (2006).
Rzeszutko, A.A. et al., "Tensile properties of self-healing epoxy", TAM Techinical Reports—1041: Proceedings of the Fifth Undergraduate Research Conference in Mechanics, pp. 27-33, (2004).
Sudduth, R.D., "Analysis of the maximum tensile strength of a composite with spherical particulates", Journal of Composite Materials, vol. 40, No. 4, pp. 301-331, (2006); published on-line (2005).
Tvergaard, V., "Effect of ductile particle debonding during crack bridging in ceramics", International Journal of Mechanical Sciences, vol. 34, No. 8, pp. 635-649, (1992).
Zhang, X.X. et al., "Fabrication and properties of microcapsules and nanocapsules containing n-octadecane", Materials Chemistry and Physics, vol. 88, pp. 300-307, (2004).
Asua, J.M., "Miniemulsion Polymerization", Prog. Polymer Science, vol. 27, pp. 1283-1346, (2002).
Schork, F.J., "Miniemulsion Polymerization", Adv. Polym. Sci., vol. 175, pp. 129-255, (2005).
Blaiszik, B.J. et al., "Nanocapsules for self-healing composites", Proceedings of the SEM annual meeting on experimental and applied mechanics, Society for Experimental Mechanics, St. Louis, MO, 6 pages, Jun. 4-7, 2006.
Alexandridou, S. et al., "Surface characterization of oil-containing polyterephthalamide microcapsules prepared by interfacial polymerization", J. Microencapsulation, vol. 18, No. 6, pp. 767-781, (2001).
IUPAC, "emulsion", IUPAC Compendium of Chemical Terminology: IUPAC Recommendations, 2nd Edition, compiled by A.D. McNaught and A. Wilkinson, Blackwell, Oxford, 1 page, (1997).
Lansalot, M. et al., "RAFT miniemulsion polymerization: Influence of the structure of the RAFT agent", Macromolecules, vol. 35, No. 20, pp. 7582-7591, (2002).
Ni, P. et al., "Effect of operating variables and monomers on the formation of polyurea microcapsules", Journal of Membrane Science, vol. 103, pp. 51-55, (1995).
Ramirez, L.P. et al.,"Magnetic polystyrene nanoparticles with a high magnetite content obtained by miniemulsion processes", Macromolecular Chemistry and Physics, vol. 204, No. 1, pp. 22-31, (2003).

Tiarks, F. et al., "Preparation of polymeric nanocapsules by miniemulsion polymerization", Langmuir, vol. 17, No. 3, pp. 908-918, (2001).

Holden, G. "Elastomers, Thermoplastic" Encyclopedia of Polymer Science and Technology, John Wiley & Sons, 1-25, 2002.

Cho, S.H., "Polydimethylsiloxane-Based Self-Healing Materials", Advanced Materials, vol. 18, Issue 8, 997-100, Apr. 7, 2006.

International Search Report and Written Opinion dated Oct. 24, 2007 for PCT application No. PCT/US2007/069981.

International Search Report and Written Opinion dated Feb. 22, 2008 for PCT application No. PCT/US2007/060149.

Keller, M.W. et al., "An elastomeric self-healing material", Proceedings of the 2006 SEM Annual Conference and Exposition on Experimental and Applied Mechanics 2006, vol. 1, pp. 379-382, (2006).

Pickering, S.U., "Emulsions", Journal of the Chemical Society, Transactions, vol. 91, pp. 2001-2021, (1907).

Finkle, P. et al., "The theory of emulsification", Journal of the American Chemical Society, vol. 45, No. 12, pp. 2780-2788, (1923).

Pieranski, P. "Two-dimensional interfacial colloidal crystals", Physical Review Letters, vol. 45, No. 7, pp. 569-572, (1980).

Gotro, J. et al., "Thermosets", Encyclopedia of Polymer Science and Technology, vol. 12, pp. 207-260, John Wiley & Sons, (2004).

Blaiszik, B.J. et al., "Nanocapsules for self-healing materials", Composites Science and Technology, vol. 68, pp. 978-986, (2008).

Gschwander, S. et al., "Micro-encapsulated paraffin in phase-change slurries", Solar Energy Materials & Solar Cells, vol. 89, pp. 307-315, (2005).

Rao, Y. et al.,"Preparation and thermal properties of microencapsulated phase change material for enhancing fluid flow heat transfer", Heat Transfer—Asian Research, vol. 36, No. 1, pp. 28-37, (2007), originally published in 2005.

Wei, L. et al., "Preparation and characterization of microencapsulated phase change material with low remnant formaldehyde content", Materials Chemistry and Physics, vol. 106, pp. 437-442, (2007).

Cayre, O.J. et al., "Fabrication of novel colloidosome microcapsules with gelled aqueous cores", Journal of Materials Chemistry, vol. 14, pp. 3351-3355, (2004).

Dinsmore, A.D. et al., "Colloidosomes: Selectively permeable capsules composed of colloidal particles", Science, vol. 298, pp. 1006-1009, (2002).

Croll, L.M. et al., "Composite tectocapsules via the self-assembly of functionalized poly(divinylbenzene) microspheres", Pure Appl. Chemistry, vol. 76, No. 7-8, pp. 1365-1374, (2004).

Utada, A.S. et al., "Monodisperse double emulsions generated from a microcapillary device", Science, vol. 308, pp. 537-541, (2005).

Shin, Y. et al., "Development of thermoregulating textile materials with microencapsulated phase change materials (PCM). II. Preparation and application of PCM Microcapsules", Journal of Applied Polymer Science, vol. 96, pp. 2005-2010, (2005).

Arshady, R., "Preparation of microspheres and microcapsules by interfacial polycondensation techniques", Journal of Microencapsulation, vol. 6, issue 1, pp. 13-28, (1989).

Mayya, K.S. et al., "Micro-encapsulation by complex coacervation: influence of surfactant", Polymer International, vol. 52, pp. 644-647, (2003).

Karukstis, K.K. et al., "Chemistry Connections: The chemical basis of everyday phenomena", Academic Press, second edition, p. 88, (2003), best available copy.

* cited by examiner

SELF-HEALING POLYMERS

FEDERALLY SPONSORED RESEARCH OR DEVELOPMENT

The subject matter of this application may have been funded in part under a research grant from the Air Force Office of Scientific Research, under AFOSR Grant Number F49620-03-1-0179. The U.S. Government may have rights in this invention.

BACKGROUND

Cracks that form within polymeric composites can be difficult to detect and almost impossible to repair. A successful method of autonomically repairing cracks that has the potential for significantly increasing the longevity of materials has been described, for example, in U.S. Pat. No. 6,518,330. This self-healing system includes a material containing, for example, solid particles of Grubbs catalyst and capsules containing liquid dicyclopentadiene (DCPD) embedded in an epoxy matrix. When a crack propagates through the material, it ruptures the microcapsules and releases DCPD into the crack plane. The DCPD then mixes with the Grubbs catalyst, undergoes Ring Opening Metathesis Polymerization (ROMP), and cures to provide structural continuity where the crack had been.

This system performs well with a relatively large (2.5 wt %) loading of catalyst, but multiple factors have made lower catalyst loadings less effective. The catalyst does not disperse well in the epoxy, so very few (but relatively large) catalyst particles are present on the crack plane when low catalyst loadings are used. In addition, the curing agent for epoxy, diethylenetriamine (DETA), destructively attacks Grubbs catalyst.

It is desirable to provide a self-healing system in which the catalyst is distributed more thoroughly. It is also desirable to provide a system in which the catalyst is less susceptible to adverse interactions with other components of the system and/or with the environment surrounding the composite material.

SUMMARY

In one aspect, the invention provides a composite material that includes a polymer matrix, a polymerizer, and a plurality of capsules. The capsules include a corresponding activator for the polymerizer.

In another aspect of the invention, there is a composite material that includes a polymer matrix, an adhesion promoter, a polymerizer phase separated from the polymer matrix, and a plurality of capsules. The capsules include a corresponding activator for the polymerizer.

In yet another aspect of the invention, there is a method of making a composite material that includes dispersing a polymerizer and capsules into a polymer matrix.

In yet another aspect of the invention, there is a method of making a composite material that includes combining a polymer matrix and an adhesion promoter, and dispersing a polymerizer and capsules into the polymer matrix. The polymerizer is phase separated from the polymer matrix in the composite material.

The following definitions are included to provide a clear and consistent understanding of the specification and claims.

A polymer is a substance containing more than 100 repeat units. The term "polymer" includes soluble and/or fusible molecules having long chains of repeat units, and also includes insoluble and infusible networks. A prepolymer is a substance containing less than 100 repeat units and that can undergo further reaction to form a polymer.

A polymerizer is a composition that will form a polymer when it comes into contact with a corresponding activator for the polymerizer. Examples of polymerizers include monomers of polymers such as styrene, ethylene, acrylates, methacrylates and dicyclopentadiene (DCPD); a monomer of a multi-monomer polymer system such as diols, diamines and epoxide; prepolymers such as partially polymerized monomers still capable of further polymerization; and functionalized polymers capable of forming larger polymers or networks.

An activator is anything that, when contacted or mixed with a polymerizer, will form a polymer. Examples of activators include catalysts and initiators. A corresponding activator for a polymerizer is an activator that, when contacted or mixed with that specific polymerizer, will form a polymer.

A catalyst is a compound or moiety that will cause a polymerizable composition to polymerize, and that is not always consumed each time it causes polymerization. This is in contrast to initiators. Examples of catalysts include silanol condensation catalysts such as titanates and dialkyltincarboxylates. Examples of catalysts also include ring opening polymerization (ROMP) catalysts such as Grubbs catalyst. A corresponding catalyst for a polymerizer is a catalyst that, when contacted or mixed with that specific polymerizer, will form a polymer.

An initiator is a compound or moiety that will cause a polymerizable composition to polymerize and, in contrast to a catalyst, is always consumed at the time it causes polymerization. Examples of initiators are peroxides (which will form a radical to cause polymerization of an unsaturated monomer); a monomer of a multi-monomer polymer system such as diols, diamines, and epoxide; and amines (which will form a polymer with an epoxide). A corresponding initiator for a polymerizer is an initiator that, when contacted or mixed with that specific polymerizer, will form a polymer.

A capsule is a closed object having an aspect ratio of 1:1 to 1:10, and that may contain a solid, liquid, gas, or combinations thereof. The aspect ratio of an object is the ratio of the shortest axis to the longest axis, where these axes need not be perpendicular. A capsule may have any shape that falls within this aspect ratio, such as a sphere, a toroid, or an irregular ameboid shape. The surface of a capsule may have any texture, for example rough or smooth. Capsules may be hollow, or they may be solid particles.

An encapsulant is a material that will dissolve or swell in a polymerizer and, when combined with an activator, will protect the activator from reaction with materials used to form a polymer. A corresponding encapsulant for a polymer and for a polymerizer will protect an activator from reaction with materials used to form that specific polymer and will dissolve or swell in that specific polymerizer. An encapsulant may be formed into particles in the shape of a capsule.

A phase separated material contains two or more regions (phases), each having different compositions, throughout the material. In contrast to a material containing a different substance in a capsule, a phase separated material does not contain a barrier material separating the phases. Examples of phase separated materials containing two or more different substances include emulsions, suspensions, heterogeneous polymer blends, block copolymers and foams. Examples of phase separated materials containing a single substance include block copolymers in which the blocks have segregated into two or more domains.

A phase separated substance is a composition that makes up one phase within a phase separated material. This phase contains at least 75 percent by weight (wt %) of this composition, and the other phase(s) contains less than 25 wt % of the composition.

An adhesion promoter is a substance that increases the adhesion between two substances, such as the adhesion between two polymers.

BRIEF DESCRIPTION OF THE DRAWINGS

The invention can be better understood with reference to the following drawings and description.

DETAILED DESCRIPTION

Figure 1A:
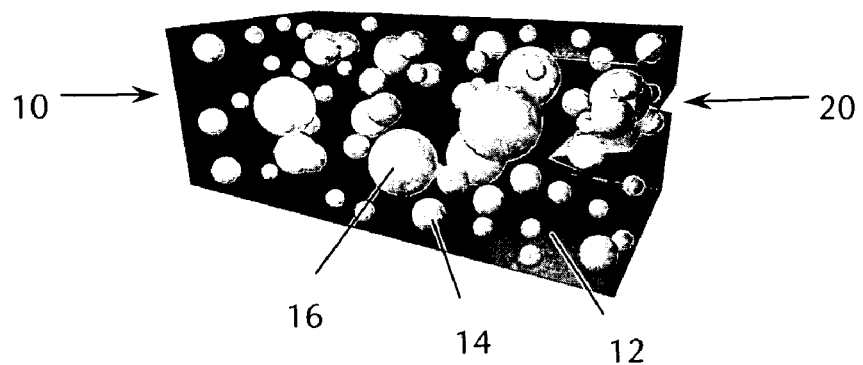
FIG. 1 is an illustration of a self-healing composite material, in which a crack has been initiated (FIG. 1A), in which the crack has progressed to release polymerizer and activator (FIG. 1B), and in which the crack has been healed by the formation of a polymer from the polymerizer and activator (FIG. 1C).

The present invention makes use of the discovery that polymerizers can be stabilized in a separate phase within a polymer matrix without being protected in a capsule. A composite material containing a polymer matrix, a phase-separated polymerizer and a corresponding activator in capsules can be self-healing. When a crack forms in the composite material, a portion of the polymerizer flows into the crack. Some of the capsules may be broken by the crack, or the polymerizer may dissolve or swell some of the capsules, exposing the activator to the polymerizer in the crack. Contact between the polymerizer and the activator forms a polymer, repairing the crack.

Composite materials containing a polymer matrix, a phase-separated polymerizer, and a corresponding activator in capsules provide advantages over previous self-healing systems. The present composite materials are more robust, having improved stability to temperature, moisture, water, air and oxygen. A wide variety of activators can be used, including activators that are low in cost and easy to process into capsules.

The present invention includes a composite material containing a polymer matrix, a polymerizer, a corresponding activator for the polymerizer, and capsules. The corresponding activator is present in the capsules. Preferably, the polymerizer is phase separated from the polymer matrix. The composite material can be prepared by mixing the matrix polymer with the capsules containing the activator and with the polymerizer.

The polymerizer contains a polymerizable substance such as a monomer, a prepolymer, or a functionalized polymer having two or more reactive groups. The polymerizer may optionally contain other ingredients, such as other monomers and/or prepolymers, stabilizers, solvents, viscosity modifiers such as polymers, inorganic fillers, odorants, colorant and dyes, blowing agents, antioxidants, and co-catalysts. A polymerizer may also contain one part of a two-part catalyst, with a corresponding initiator being the other part of the two-part catalyst. Preferably, the polymerizer is a liquid. Preferably, the polymerizer is in a separate phase from the polymer matrix in the composite material.

Examples of polymerizable substances include functionalized siloxanes, such as siloxane prepolymers and polysiloxanes having two or more reactive groups. Functionalized siloxanes include, for example, silanol-functional siloxanes and alkoxy-functional siloxanes. Examples of polymerizable substances also include epoxy-functionalized monomers, prepolymers or polymers. Examples of polymerizable monomers include cyclic olefins, preferably containing 4-50 carbon atoms and optionally containing heteroatoms, such as DCPD, substituted DCPDs, norbornene, substituted norbornene, cyclooctadiene, and substituted cyclooctadiene. Examples of polymerizable monomers also include unsaturated monomers such as acrylates, alkylacrylates (including methacrylates and ethacrylates), styrenes, isoprene and butadiene. Examples of polymerizable monomers also include lactones such as caprolactone, and lactams, that when polymerized will form polyesters and nylons, respectively.

A polymerizer may contain a two-part polymerizer, in which two different substances react together to form a polymer when contacted with an activator. Examples of polymers that can be formed from two-part polymerizer systems include polyethers, polyesters, polycarbonates, polyanhydrides, polyamides, formaldehyde polymers (including phenol-formaldehyde, urea-formaldehyde and melamine-formaldehyde), and polyurethanes. For example, a polyurethane can be formed by the reaction of one compound containing two or more isocyanate functional groups (—N=C=O) with another compound containing two or more hydroxyl functional groups (—OH).

In another example of a two-part polymerizer, one part or both parts of the polymerizer can be a polymer containing two or more functional groups. For example, a silanol-functional polysiloxane can react with an alkoxy-functional polysiloxane to form a polysiloxane network. In the reaction of hydroxyl terminated polydimethylsiloxane (HOPDMS) with polydiethoxysiloxane (PDES), an activator such as dibutyltin dilaurate provides for elimination of ethanol and formation of a polydimethylsiloxane network, as illustrated in the following reaction scheme:

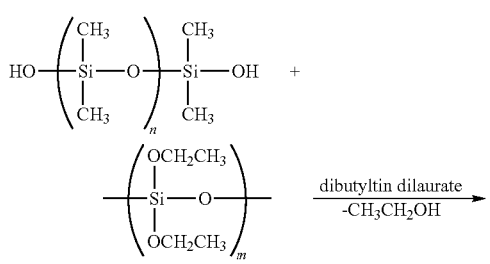

-continued

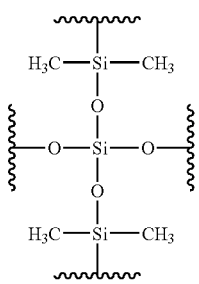

An activator for the polymerizer is present in the composite material in capsules. The capsules keep the activator separate from the polymerizer until the composite material is subjected to a crack, at which point the activator and polymerizer can come into contact to form a polymer in the crack. The activator in the capsules may be present with other ingredients, such as stabilizers, solvents, viscosity modifiers such as polymers, inorganic fillers, odorants, colorant and dyes, blowing agents, antioxidants and co-catalysts. If the polymerizer is a two-part polymerizer, then one of the polymerizable substances may be present in the capsules with the activator, as long as the polymerizable substance does not consume the activator. The activator may be a general activator for polymerization, or it may be a corresponding activator for the specific polymerizer present in the composite material. Preferably the activator is a corresponding activator.

Corresponding activators for the reaction of silanol-functional siloxanes with alkoxy-functional siloxanes include any catalyst that promotes silanol condensation or the reaction of silanol with alkoxy-functional siloxane groups. Examples of these catalysts include amines and include metal salts, where the metal can be lead, tin, zirconium, antimony, iron, cadmium, calcium, barium, manganese, bismuth or titanium. Specific examples of amines include amine compounds, such as n-hexylamine and cyclohexylamine; and amine salts, such as hexylamine hydrochloride, butylamine acetate and guanidine di-ethylhexoate. Metal salts include, for example, metal salts of carboxylic acids. Specific examples of metal salts include carboxylic acid salts of tin, such as dibutyltin dilaurate, dibutyltin diacetate, tin(II)octoate, tin(II)neodecanoate, tin(II)oleate, dibutyltin diisooctylmaleate, dibutyltin didodecanoate, di-n-butylbutoxychlorotin, dimethyltin dineodecanoate, dioctyltin dilaurate, dibutyidimethoxystannane, bis(acetoxydibutyltin)oxide, tetrakis(acetoxydibutyltinoxy)silane, 4,4,8,8-tetrabutyl-2,2,6,6-tetraethoxy-I,3,5,7-tetraoxa-2,6-di-sila-4,8-distannocane, α-ethyl-ω-acetoxypoly(diethoxysiloxaneoxydibutyl stannanediyl), and di-n-butylbis(2-ethylhexanoate)tin. Specific examples of metal salts also include carboxylic acid salts of lead, such as lead laurate; carboxylic acid salts of cobalt, such as cobalt naphthenate; and carboxylic acid salts of titanium, such as tetrabutyl titanate, tetraoctyl titanate, tetraisopropyl titanate, titanium di-n-butoxide bis(2,4-pentanedionate), titanium diisopropoxide bis(2,4-pentanedionate), and titanium diisopropoxide bis(ethylacetoacetate).

Corresponding activators for epoxy polymers include any activator that can react with two or more epoxy functional groups. For example, an epoxy polymer can be formed by the reaction at or below room temperature (25° C.) of one compound containing two or more epoxy functional groups with another compound containing either at least one primary amine group or at least two secondary amine groups. In these systems, the amine compound can be present in a composite material as the activator for an epoxy functionalized polymerizer.

Corresponding catalysts for polymerizable cyclic olefins are ring opening metathesis polymerization (ROMP) catalysts such as Schrock catalysts (Bazan, G. C.; Schrock, R. R.; Cho, H.-N.; Gibson, V. C. *Macromolecules* 24, 4495-4502 (1991)) and Grubbs catalysts (Grubbs, R. H.; Chang, S. *Tetrahedron* 54, 4413-4450 (1998)). Corresponding catalysts for lactones and lactams are cyclic ester polymerization catalysts and cyclic amide polymerization catalysts, such as scandium triflate.

Corresponding catalysts may be two-part catalysts, in which two distinct substances must be present in combination for the catalyst to function. Both parts of a two-part catalyst may be present in a mixture in the capsules, or the two parts may be separated into different capsules. The two parts of a two-part catalyst can also be separated between the capsules and the polymerizer.

In one example of a two-part catalyst system, one part of the catalyst may be a tungsten compound, such as an organoammonium tungstate, an organoarsonium tungstate, or an organophosphonium tungstate; or a molybdenum compound, such as organoammonium molybdate, an organoarsonium molybdate, or an organophosphonium molybdate. The second part of the catalyst may be an alkyl metal halide, such as an alkoxyalkyl metal halide, an aryloxyalkyl metal halide, or a metaloxyalkyl metal halide in which the metal is independently tin, lead, or aluminum; or an organic tin compound, such as a tetraalkyltin, a trialkyltin hydride, or a triaryltin hydride.

In another such system, the polymerizer may contain unsaturated polymerizable compounds such as acrylates, alkylacrylates (including methacrylates and ethacrylates), styrenes; isoprene; and butadiene. In this case, atom transfer radical polymerization (ATRP) may be used, with one of the two components being mixed with the polymerizable compound and the other acting as the initiator. One component can be an organohalide such as 1-chloro-1-phenylethane, and the other component can be a copper(I) source such as copper (I) bipyridyl complex. In another exemplary system, one component could be a peroxide such as benzoyl peroxide, and the other component could be a nitroxo precursor such as 2,2,6,6-tetramethylpiperidinyl-1-oxy (TEMPO). These systems are described in Malcolm P. Stevens; *Polymer Chemistry: An Introduction, 3rd Edition*; New York: Oxford University Press, 1999, p. 184-186.

In another such system, a polymerizable material may contain isocyanate functional groups (—N═C═O) and hydroxyl functional groups (—OH). For this system, the polymerizable material may for example be a compound containing both an isocyanate group and a hydroxyl group, or two different compounds, one compound containing at least two isocyanate groups and the other compound containing at least two hydroxyl groups. The reaction between an isocyanate group and a hydroxyl group can form a urethane linkage (—NH—C(═O)—O—) between the compounds, possibly releasing carbon dioxide. This carbon dioxide can provide for the creation of expanded polyurethane foam; optionally the polymerizer may contain a blowing agent, for example a volatile liquid such as dichloromethane. In this case, condensation polymerization may be used, with one of the two components being mixed with the polymerizable compound and the other acting as the initiator. For example, one component could be an alkyltin compound such as stannous 2-ethylhexanoate, and the other component could be a tertiary amine such as diazabicyclo[2.2.2]octane (DABCO). These systems are described in Malcolm P. Stevens; *Polymer Chemistry: An Introduction*, 3rd Edition; New York: Oxford University Press, 1999, p. 378-381.

The activator is contained in capsules so as to isolate the activator from the polymerizer and from the environment in which the composite material is made and/or used. Preferably, the capsules have an average diameter of 10 nm to 1 mm, more preferably 30-500 μm, most preferably 50-300 μm. The capsules have an aspect ratio of 1:1 to 1:10, preferably 1:1 to 1:5, more preferably 1:1 to 1:3, and even more preferably 1:1 to 1:2, and most preferably 1:1 to 1:1.5. Capsules may be hollow, having a capsule wall enclosing an interior volume containing the activator. Capsules may be particles containing a mixture of the activator and an encapsulant.

Hollow capsules having a capsule wall enclosing an interior volume may have wall thickness from 100 nm to 3 μm. The selection of capsule wall thickness depends on the polymer matrix in the composite material. For example, capsule walls that are too thick will not rupture when a crack approaches, while capsules with very thin walls will break during processing. Hollow capsules may be made by a variety of techniques, and from a variety of materials, such as those described in *Microencapsulation: Methods and Industrial Applications* Ed. Benita, Simon Marcel Dekker, New York, 1996; *Microencapsulation: Processes and Applications* Ed. Vandegaer, J. Plenum Press, New York, 1974; and *Microcapsule Processing and Technology Kondo*, A. Marcel Dekker, New York, 1979. Examples of materials from which the capsules may be made, and the techniques for making them include: polyurethane, formed by the reaction of isocyanates with a diol; urea-formaldehyde, formed by in situ polymerization; gelatin, formed by complex coacervation; polyurea, formed by the reaction of isocyanates with a diamine or a triamine, depending on the degree of crosslinking and brittleness desired; polystyrenes or polydivinylbenzenes formed by addition polymerization; and polyamide, formed by the use of a suitable acid chloride and a water soluble triamine.

Capsules in the form of particles containing a mixture of the activator and an encapsulant may be made by a variety of techniques, and from a variety of materials. For example, small particles or a powder of the activator may be dispersed into a liquid containing the encapsulant, followed by solidification of the mixture of encapsulant and activator. Particles of the protected activator in an encapsulant are preferably microparticles having an average diameter of at most 500 micrometers. The encapsulant is soluble or swellable in the polymerizer, and is a solid at room temperature. The polymerizer may dissolve the encapsulant, releasing the activator and forming a polymer. The polymerizer may swell the encapsulant so that the particle can be penetrated by the polymerizer sufficiently to allow polymerization of the polymerizer when it contacts the activator.

In one example the encapsulant is melted, the activator is added to the molten encapsulant, and then the system is cooled. The solid mixture may then be ground up to form particles. Similarly, the encapsulant may be dissolved in a solvent to form a solution, mixed with the activator, the solvent removed, and again the solid mixture ground up to form particles. The molten mixture or solution also may be formed into particles using the methods described in U.S. Pat. No. 6,669,961. In another example, the liquid mixture is poured into a solvent in which both the encapsulant and the activator are insoluble, and then formed into a suspension by rapid stirring. Cooling with rapid stirring solidifies the encapsulant, to form particles of the activator in the encapsulant. A surfactant may be included to facilitate the formation of the suspension and/or the particles. In yet another example, the encapsulant may be formed by the reaction of two or more compounds, such as a polymerization reaction. In this example, a liquid containing the reactants is formed, the activator is added to the liquid, and then the reaction forms a mixture of the protected activator in the encapsulant. Again, the resulting solid may be ground up to form particles.

In a specific example, a wax may be used as the encapsulant, and dibutyltin dilaurate may be used as the activator. The wax-protected catalyst microparticles may be synthesized by pouring a mixture of the molten wax and into a hot, rapidly-stirred, aqueous solution of poly(ethylene-co-maleic anhydride) (EMA). The resulting suspension of molten wax droplets may then be rapidly cooled with the addition of cold water to solidify the wax. The wax microparticles can be filtered, dried, and sifted to give a coarse powder. In model systems without an activator, the average sizes of microparticles made by this method were controlled by the rate of stirring. For example, with stirring rates of 450, 900, and 1500 RPM, the average diameters of collected wax microparticles were 150, 90, and 50 μm, respectively. Narrower size ranges can be isolated through the use of sieves. The EMA was included as a surfactant to facilitate the formation of a suspension. In the absence of EMA, the average particle size was increased by more than a factor of three, and non-spherical wax debris was formed.

Examples of encapsulants include polymers and waxes. Waxes are water insoluble, organic materials that are solid or semi-solid at room temperature, usually of lower density than water, and typically can be melted above room temperature to form a liquid. Preferred waxes include any naturally occurring and synthetic waxes, wax esters, and greases that generally have a melting temperature of 30° C. or more, with a melting range of less than 10° C., and that are usually non-reactive with the reagents or solvents to which they are exposed. Examples of waxes include esters of various long-chain (fatty) alcohols and long-chain acids, preferably where at least one member of the ester has 10 or more carbon atoms, including various unsaturated and branched chain types and also those esters of glycerols and sterols. Also, certain free alcohols or acids have wax-like properties of melting temperature and inertness. Examples of saturated fatty acids that may be encapsulants include capric, lauric, myristic, palmitic, margaric, stearic, arachidic, behenic, tetracosanic, lignoceric, cerotic, and melissic. Examples of unsaturated fatty acids that may be encapsulants include tiglic, hypogaeic, gaidic, physetoleic, elaidic, oleic, isooleic, erudic, brassidic, and isoerudic. Examples of fatty alcohols that may be encapsulants include octadecyl, carnaubyl, ceryl, melissyl, and phytol. Also included are various esters of these and other fatty acids with any suitable fatty alcohols, or sterols such as cholesterol, or glycerols. Other examples include natural or suitably modified or derivatized waxes such as various plant derived waxes, greases and oils including carnauba wax, cranberry wax, ouricuri wax, candelilla wax, raphia wax, apple, cotton and cactus waxes; waxes (including greases) produced by bacteria (e.g. cetyl stearate); fungi, protozoa and algae; various invertebrate waxes and greases including insect waxes such as beeswaxes (e.g. triacontyl palmitate, palmatyl palmitate), and *Coccus* sp. derived waxes (e.g. lac, cochineal and Chinese insect); other animal fats (e.g. triglycerides) and waxes including spermaceti (e.g. cetyl palmitate), lanolin and wool grease.

Also included are various derivatives, extracts, and combinations of these materials. Other suitable waxes include many natural or synthetic hydrocarbons such as white waxes, paraffins, ceresins, vaselines, silicon greases and waxes, polychlorinated or polyfluorinated hydrocarbons, aromatic hydrocarbons (such as naphthalene and durene (1,2,4,5-tetramethylbenzene)), polyether waxes and polyester waxes. Waxes include waxy polymers, which are polymers that have wax-like chemical or physical properties alone or when combined with other waxes. Examples of waxy polymers include polyethylenes and polypropylenes. Examples of polymers that may be combined with waxes to produce waxy polymers include certain gums and rubbers, various kinds of latex, gutta-percha, balata, chicle and various derivatives. Also included are synthetic rubbers such as isoprene polymers, hydrogenated rubber, butadiene polymers, chloroprene polymers and butyl polymers.

Examples of encapsulants also include paraffin wax, ceresine wax, beeswax, microcrystalline wax, petroleum wax, gelatin, guar gum, acacia (gum arabic), carob bean gum, carrageenan, xanthan gum, food starch, carboxymethyl cellulose, ethyl cellulose, methyl cellulose, cellulose acetate, cellulose nitrate, silcone rubber, butyl rubber, butadiene-styrene rubber, polyurethane, epoxy, polyvinyl alcohol, polyvinyl acetate, polydimethyl siloxane, urea formaldehyde, polyethylene, polyethylene glycol, polystyrene, polymethyl methacrylate, polypropylene, polyvinyl chloride, polyvinyl alcohol, polycarbonate, and polyamide.

The polymer matrix may be any polymeric material into which the capsules may be dispersed, and which can be formed as a phase separated mixture with the polymerizer. Examples of matrix polymers include polyamides such as nylons; polyesters such as poly(ethylene terephthalate) and polycaprolactone; polycarbonates; polyethers; epoxy polymers; epoxy vinyl ester polymers; polyimides such as poly-pyromellitimide (for example KAPTAN); phenol-formaldehyde polymers (for example BAKELITE); amine-formaldehyde polymers such as a melamine polymer; polysulfones; poly(acrylonitrile-butadiene-styrene) (ABS); polyurethanes; polyolefins such as polyethylene, polystyrene, polyacrylonitrile, polyvinyls, polyvinyl chloride and poly(DCPD); polyacrylates such as poly(ethyl acrylate); poly(alkylacrylates) such as poly(methyl methacrylate); polysilanes such as poly(carborane-siloxane); and polyphosphazenes. The polymer matrix can include other ingredients in addition to the polymeric material. For example, the matrix can contain stabilizers, antioxidants, flame retardants, plasticizers, colorants and dyes, fragrances, particulate fillers, reinforcing fibers, and adhesion promoters.

One type of adhesion promoter that may be present includes substances that promote adhesion between the polymer matrix and the capsules. The adhesion between the matrix and the capsules may influence whether the capsules will rupture or debond in the presence of an approaching crack. To promote the adhesion between the polymer and capsule wall, various silane coupling agents may be used. Typically, these are compounds of the formula R—SiX$_3$, where R is preferably a reactive group $R^1$ separated by a propylene group from silicon, and X is an alkoxy group (preferably methoxy), such as $R^1$ CH$_2$ CH$_2$ CH$_2$ Si(OCH$_3$)$_3$. Examples include silane coupling agents available from DOW CORNING (with reactive group following the name in parentheses): Z6020 (Diamino); Z6030 (Methacrylate); Z6032 (Styrylamine Cationic); Z6040 (Epoxy); and Z6075 (Vinyl). To increase the adhesion between the capsules and a polymer in the composite material, the capsules may be treated by washing them in a solution of the coupling agent. For example, urea-formaldehyde capsules may be washed in a solution of Silane Z6020 or Z6040 and hexane (1:20 wt.) followed by adding Silane Z6032 to the polymer (1% wt.).

Another type of adhesion promoter that may be present includes substances that promote adhesion between the polymer matrix and the polymer formed from the polymerizer when contacted with the activator. The adhesion between the matrix and this polymer may influence whether the composite material can be healed once a crack has been introduced. To promote the adhesion between the polymer matrix and the polymer formed in the crack, various unsaturated silane coupling agents may be used. Typically, these are compounds of the formula $R^2$—SiX'X"X'", where R is preferably an unsaturated group $R^3$ separated by a propylene group from silicon; and X', X" and X'" are independently alkyl or alkoxy, such that at least one of X', X" and X'" is an alkoxy group (preferably ethoxy), such as $R^3$ CH$_2$ CH$_2$ CH$_2$ Si(OCH$_2$CH$_3$)$_3$. Examples include silane coupling agents available from GELEST, such as (3-acryloxypropyl)-trimethoxysilane, (3-acryloxypropyl)methyldimethoxysilane, methacryloxypropyl-trimethoxysilane, methacryloxypropylmethyldimethoxysilane, methacryloxypropyl-triethoxysilane, methacryloxypropylmethyldiethoxysilane. To increase the adhesion between the polymer matrix and the polymer formed in the crack, the adhesion promoter can be mixed with the matrix polymer before the final composite material is formed.

A composite material can be prepared by mixing the matrix polymer with the polymerizer and the capsules. The mixture can then be formed into the final shape and solidified. Preferably the polymerizer is phase separated from the matrix polymer in the final composite material. It is desirable for the polymerizer and the capsules to be dispersed throughout the composite material, so that a crack will intersect one or more regions of the polymerizer phase, and will also impinge on one or more capsules. For hollow capsules, it is desirable for the crack to break the capsules; and for particles containing an encapsulant, it is desirable for the capsules to be exposed to the polymerizer. The capsules and polymerizer may be dispersed into the polymer by forming the polymer around the capsules and polymerizer. For example, monomers and/or prepolymers can be mixed with the polymerizer and the capsules, and the monomers and/or prepolymers can then be polymerized to form the polymer matrix containing the polymerizer and the capsules. The capsules and polymerizer also may be dispersed into a fully formed matrix polymer. For example, the matrix polymer may be dissolved in a solvent and the capsules and polymerizer mixed into the solution, followed by removal of the solvent. In another example, the matrix polymer may be melt processed, mixed with the polymerizer and the capsules, and then solidified.

Figure 1B:
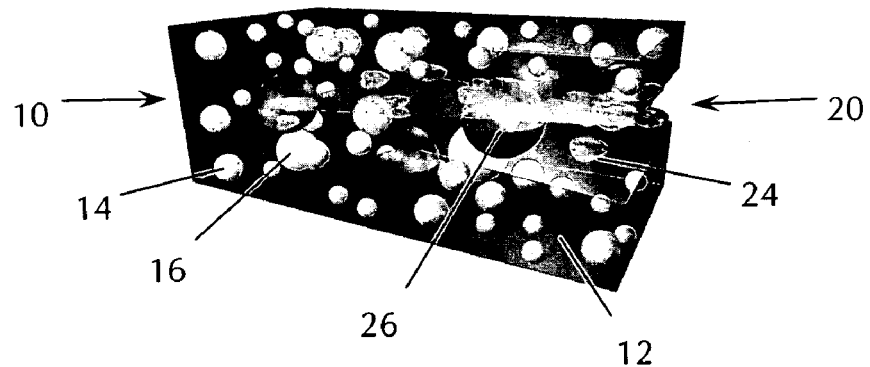
Figure 1C:
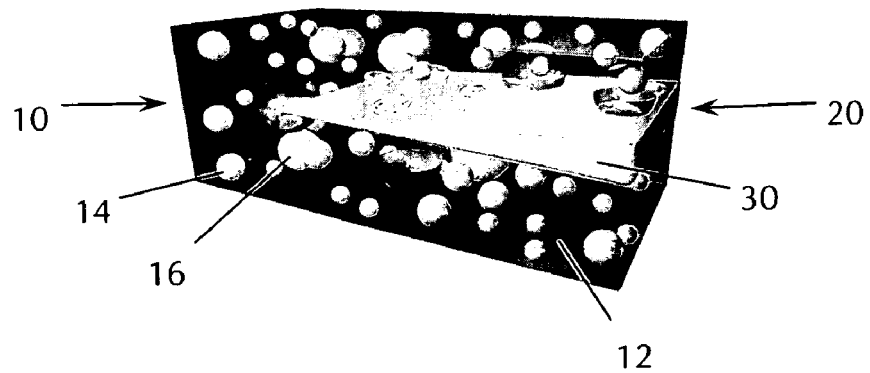

Referring to FIG. 1, a composite material containing a polymer matrix, a polymerizer, and an activator in capsules can be self-healing. FIG. 1A illustrates a composite material 10 having a polymer matrix 12, phase separated droplets of a polymerizer 14, and capsules 16 containing an activator. A crack 20 has begun to form in the composite material. FIG. 1B illustrates this composite material when the crack has progressed far enough to intersect droplets of polymerizer and capsules containing the activator. Voids 24 indicate that the polymerizer has flowed into the crack, and broken capsules 26 indicate that the activator has also been released into the crack. FIG. 1C illustrates the composite material after the polymerizer and the activator have been in contact for a time sufficient to form a polymer 30 that fills the space from the crack.

The following examples are provided to illustrate one or more preferred embodiments of the invention. Numerous variations can be made to the following examples that lie within the scope of the invention.

EXAMPLES

Example 1

Formation of Capsules Containing Activator

Dibutyltin dilaurate was encapsulated within polyurethane microcapsules formed through interfacial polymerization. A urethane prepolymer was synthesized by first dissolving toluene 2,4-diisocyanate (TDI, Aldrich, 22.0 g, mp=19.5-21.5° C.) in cyclohexanone (142 g, $bp_{760}$=155.6° C.). The diol reactant, 1,4-butanediol (5.0 g), was added to this stirred mixture at 5 ml/min using a syringe pump, and the reaction mixture was stirred and heated at 80° C. for 24 hours. To avoid formation of a gel during microencapsulation, the mol ratio of TDI to 1,4-butandediol was kept less than 2.3. Once the prepolymer was formed, the cyclohexanone was evaporated under vacuum at 100° C. The urethane prepolymer had excess isocyanate functional groups, which could be reacted to form a higher molecular weight polymer through the use of a chain extender. The amount of chain extender to add was determined by titration of the isocyanate functional group in urethane prepolymer, following ASTM D2572-97.

Figure 2:
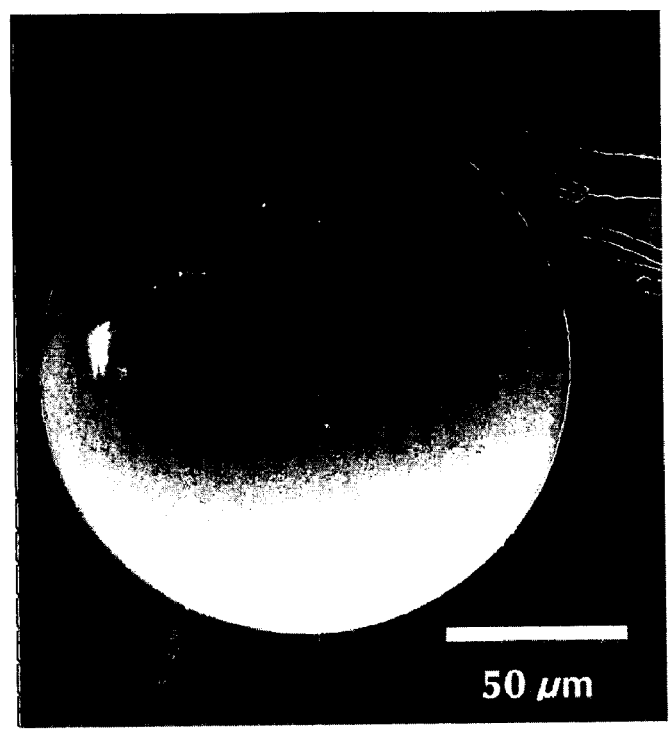
FIG. 2 is a scanning electron microscopy (SEM) image of a microcapsule containing an activator.

Urethane microcapsules containing the tin catalyst were then formed by mixing the urethane prepolymer (3.0 g) and dibutyltin dilaurate (DBTL-Sn; Gelest, 1 g) in 32 g chlorobenzene, and then adding this mixture to 28.8 g of a water solution containing 15 wt % gum arabic (Aldrich, suspending agent). After stirring for 30 min at 70° C., an ethylene glycol chain extender was added to the mixture at 5 mL/min. The amount of ethylene glycol was 30 wt % relative to the urethane prepolymer. Spherical microcapsules with smooth surfaces were obtained after 2 hours at 70° C. with mechanical stirring at 700 rpm. The average microcapsule diameter ranged from 150 to 200 μm. FIG. 2 is a scanning electron microscopy (SEM) image of one of these microcapsules. The microcapsules effectively isolated the catalyst, as evidenced by a lack of catalytic activity when intact microcapsules were contacted with a mixture of the reactive polysiloxanes hydroxyl terminated polydimethylsiloxane (HOPDMS) with polydiethoxysiloxane (PDES).

Example 2

Formation of Epoxy Vinyl Ester

Epoxy vinyl ester polymers were formed without incorporation of polymerizer or microcapsules, for use as control materials in the testing of the composite materials. The epoxy vinyl ester polymers were formed from the epoxy vinyl ester composition DERAKANE 510A-40 (ASHLAND; Dublin, Ohio), a brominated bisphenol-A based vinyl ester composition containing approximately 38% monomeric styrene. The DERAKANE 510A-40 prepolymer was mixed with 1 wt % benzoylperoxide (BPO) initiator until the BPO was dissolved, and then 0.1 wt % dimethylaniline (DMA) accelerator was added. After the mixture was degassed under vacuum, it was poured into a closed silicone rubber mold and cured for 24 hours at room temperature, followed by curing at 50° C. for another 24 hours. Two types of control samples were formed, with and without the presence of an adhesion promoter. For the control samples formed with an adhesion promoter, 4 wt % methylacryloxypropyltriethoxysilane was added to the prepolymer.

Example 3

Formation of Composite Material

A composite material was formed by incorporating the microcapsules of Example 1 and a polymerizer with an epoxy vinyl ester polymer. The epoxy vinyl ester polymer was formed from DERAKANE 510A-40 (ASHLAND; Dublin, Ohio), a brominated bisphenol-A based vinyl ester composition containing approximately 38% monomeric styrene. The DERAKANE 510A-40 prepolymer was mixed with 1 wt % benzoylperoxide (BPO) initiator until the BPO was dissolved. A mixture of HOPDMS and PDES was added into this prepolymer mixture with mechanical stirring at 600 rpm, followed by degassing under vacuum. The microcapsules of Example 1 were then added, together with 0.1 wt % dimethylaniline (DMA) accelerator, followed by another degassing step. This mixture was then poured into a closed silicone rubber mold and cured for 24 hours at room temperature, followed by curing at 50° C. for another 24 hours.

Figure 3:
FIG. 3 is an SEM image of a fracture surface of a composite material.

The functionalized polysiloxanes, HOPDMS and PDES, were immiscible with the epoxy vinyl ester prepolymer. The vigorous mixing dispersed this functionalized polysiloxane mixture as 1-20 μm diameter droplets that were phase separated within the epoxy vinyl ester polymer. The DBTL-Sn catalyst remained encapsulated within the polyurethane microcapsules, and these microcapsules were also dispersed throughout the epoxy vinyl ester polymer. FIG. 3 is an SEM image of a fracture surface of a composite material, showing the uniform dispersion of polymerizer droplets and microcapsules in the polymer matrix. The large circular void was an empty microcapsule, and the smaller circular voids had contained phase separated functionalized polysiloxane mixture.

Example 4

Formation of Composite Material Using Adhesion Promoter

A composite material was formed as described in Example 3, except that the adhesion promoter methylacryloxypropyltriethoxysilane was added to the epoxy vinyl ester prepolymer. The relative amounts of functionalized polysiloxane, adhesion promoter, and microcapsules containing the DBTL-Sn catalyst are listed in Table 1.

TABLE 1

| Average maximum load of self-healed vinyl ester | | | | | |
|---|---|---|---|---|---|
| Composition* | | | | Healing efficiency** | |
| Siloxane (wt %) | Adhesion promoter (wt %) | Microcapsules (wt %) | Fracture load (N) | Load (%) | Area (%) |
| 8 | 4 | 2.4 | 14 [3] | 17 [3] | 7 [1] |
| 8 | 4 | 5.0 | 9 [5] | 11 [6] | 4 [4] |
| 12 | 2 | 3.6 | 14 [2] | 17 [3] | 8 [1] |
| 12 | 4 | 3.6 | 37 [7] | 46 [7] | 34 [9] |
| 12 | 8 | 3.6 | 28 [5] | 35 [6] | 26 [7] |
| 15 | 4 | 2.4 | 21 [1] | 26 [2] | 16 [2] |
| 15 | 4 | 4.5 | 37 [3] | 45 [4] | 33 [3] |

*Remainder is epoxy vinyl ester polymer.
**Calculated relative to epoxy vinyl ester polymer without siloxane or microcapsules.

Example 5

Testing of Composite Materials

Figure 4:
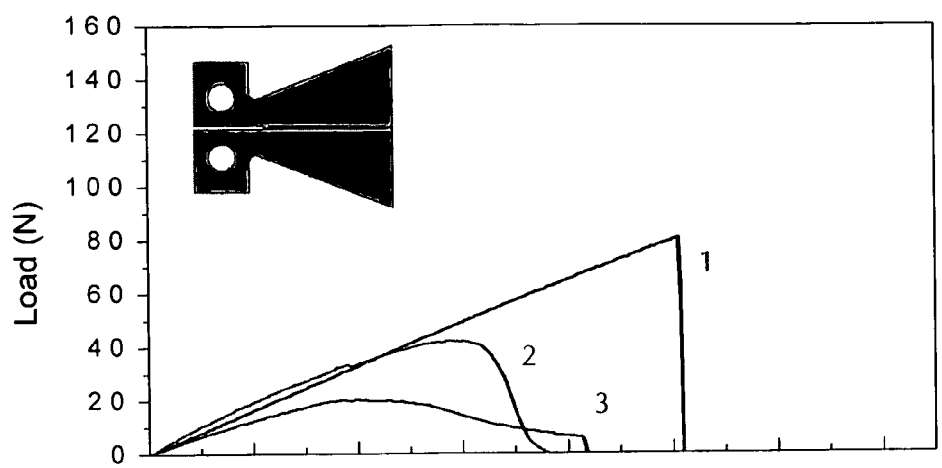
FIG. 4 is a set of graphs of load versus displacement for epoxy vinyl ester polymers, including the first fracture (1), injection-healed with adhesion promoter (2) and injection healed without adhesion promoter (3).
Figure 5:
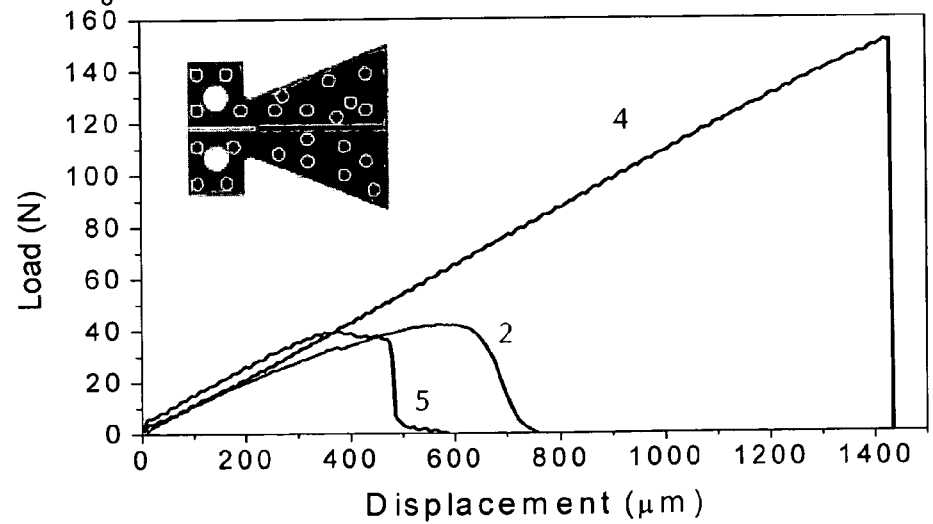
FIG. 5 is a set of graphs of load versus displacement for a self-healing composite material containing 4 wt % adhesion promoter, 12 wt % polymerizer and 3.6 wt % microcapsules containing activator, including the first fracture (4) and after self-healing (5). The epoxy vinyl ester polymer, injection-healed with adhesion promoter, (2) is also shown for comparison.

Critical fracture loads were measured by carefully controlled fracture experiments utilizing a tapered double cantilever beam (TDCB) sample, as illustrated schematically in the insert of FIGS. 4 and 5. The TDCB geometry ensures controlled crack growth along the centerline of the composite material and provides a crack length independent measure of fracture toughness for both virgin and healed materials. The polycondensation of HOPDMS with PDES occurs rapidly at room temperature in the presence of amine and carboxylic acid organotin catalysts. Because side reactions are limited, organotin catalysts are effective for curing PDMS based systems, even in open air.

After preparation of TDCB specimens, a sharp pre-crack was created by gently tapping a razor blade into the molded starter notch in the samples. All fracture specimens were tested under displacement control, using pin loading and 5 μm/s displacement rate. Samples were tested to failure, measuring compliance and peak load at fracture ($P_{c,\ virgin}$). Fractured samples were unloaded, allowing the crack faces to come back into contact, and healed in this state for 24 hours at 50° C. These healed samples were then tested to failure using the same testing procedure, measuring compliance and peak load at fracture ($P_{c,\ healed}$). Healing efficiency was calculated based on both the peak load at fracture and the fracture energy. The healing efficiency based on peak load at fracture, η, was defined as the ratio of the peak loads at fracture for the healed sample and for a virgin control sample, $\eta = P_{c,\ healed}/P_{c,\ virgin,\ control}$. For non-linear behavior during healing, the strain energy at crack propagation or final failure provided a better measure of healing ability. This fracture energy was calculated as the area under the load-displacement curve for virgin samples ($A_{virgin}$) and for healed samples ($A_{healed}$). The healing efficiency based on fracture energy, η', was defined as the ratio of the fracture energy for the healed sample and for a virgin control sample $\eta' = A_{healed}/A_{virgin,\ control}$. The results of these measurements and calculations are listed in Table 1. The average healing efficiency and standard deviations were calculated from at least five fracture tests.

The composite materials of Example 3 had low levels of healing efficiency when tested. One possible explanation for the low healing efficiency is that the epoxy vinyl ester polymer matrix had poor inherent adhesion with the polydimethylsiloxane network (PDMS) in the crack. Post-fracture analysis of these specimens revealed that final failure of the healed specimen was adhesive failure between the PDMS and the epoxy vinyl ester polymer matrix surface. The presence of an adhesion promoter in the epoxy vinyl ester polymer provided an increase in healing efficiency for the control samples. The graphs of FIG. 4 show the load as a function of displacement for a virgin control sample (plot 1) and for control samples that had been healed by injection of a mixture of HOPDMS, PDES and DBTL-Sn catalyst (plots 2 and 3) into the crack plane. The healing efficiency of the control sample containing adhesion promoter (plot 2) was more than double that of the control sample without adhesion promoter (plot 3).

The composite materials of Example 4 had levels of healing efficiency similar to those of the control samples healed by injection of the functionalized polysiloxane/catalyst mixture. The graphs of FIG. 5 show the load as a function of displacement for a virgin composite material (plot 4) and for the same composite material after healing (plot 5). The injection-healed control sample containing adhesion promoter is shown for comparison (plot 2). The data for FIG. 5 was for the composite material containing 12 wt % functionalized polysiloxane, 4 wt % adhesion promoter, and 3.6 wt % microcapsules. Thus, self-healing was as effective in bonding the cracked material as manually injecting the functionalized polysiloxane/catalyst mixture into the crack.

The virgin composite materials exhibited much larger values of peak load at fracture than the control samples of epoxy vinyl ester polymer. Referring again to FIGS. 4 and 5, the load as a function of displacement for the virgin control polymer is shown as plot 1, and the load as a function of displacement for the virgin composite material containing 12 wt % functionalized polysiloxane, 4 wt % adhesion promoter, and 3.6 wt % microcapsules is shown as plot 4. For these two systems, the increase in mode-I fracture toughness of the composite material relative to the control is approximately 88%, based on the peak load at fracture. Thus, the inclusion of phase separated healing agent and microcapsules of catalyst increases the toughness of the epoxy vinyl ester polymer matrix.

While various embodiments of the invention have been described, it will be apparent to those of ordinary skill in the art that other embodiments and implementations are possible within the scope of the invention. Accordingly, the invention is not to be restricted except in light of the attached claims and their equivalents.

What is claimed is:

1. A composite material, comprising:
   a polymer matrix;
   a polymerizer phase comprising a polymerizer; and
   a plurality of capsules comprising a corresponding activator for the polymerizer;
   where the polymerizer phase is phase separated from the polymer matrix,
   the capsules are separate from the polymerizer phase,
   the capsules isolate the corresponding activator from the polymerizer until a crack in the composite material intersects at least a portion of the capsules and at least a portion of the polymerizer phase, and
   the corresponding activator is a catalyst comprising a metal selected from the group consisting of lead, tin, zirconium, antimony, iron, cadmium, calcium, barium, manganese, bismuth and titanium.

2. The composite material of claim 1, wherein the polymerizer comprises at least one functionalized siloxane.

3. The composite material of claim 1, wherein the catalyst comprises a tin salt.

4. The composite material of claim 3, wherein the tin salt is a salt of a carboxylic acid.

5. The composite material of claim 1, wherein the polymer matrix comprises at least one member selected from the group consisting of polyamides, polyesters, polycarbonates, polyethers, epoxy polymers, epoxy vinyl ester polymers, polyimides, phenol-formaldehyde polymers, amine-formaldehyde polymers, polysulfones, poly(acrylonitrile-butadiene-styrene), polyurethanes, polyolefins, polyacrylates, poly(alkylacrylates) and polysilanes.

6. The composite material of claim 1, wherein the polymer matrix comprises an epoxy vinyl ester polymer.

7. The composite material of claim 1, wherein the capsules are hollow.

8. The composite material of claim 1, wherein the capsules are particles.

9. The composite material of claim 1, wherein the capsules have an aspect ratio of 1:1 to 1:2, and an average diameter of 10 nm to 1 mm.

10. A method of making the composite material of claim 1, comprising:

dispersing the polymerizer and the capsules into the polymer matrix.

11. A composite material, comprising:
a polymer matrix;
an adhesion promoter;
a polymerizer phase comprising a polymerizer; and
a plurality of capsules comprising a corresponding activator for the polymerizer;
where the polymerizer phase is phase separated from the polymer matrix,
the capsules are separate from the polymerizer phase,
the capsules isolate the corresponding activator from the polymerizer until a crack in the composite material intersects at least a portion of the capsules and at least a portion of the polymerizer phase, and
the polymerizer comprises a mixture of hydroxyl terminated polydimethylsiloxane (HOPDMS) and polydiethoxysiloxane (PDES).

12. A method of making the composite material of claim 11, comprising:
combining the polymer matrix and the adhesion promoter; and
dispersing the polymerizer and the capsules into the polymer matrix;
wherein the polymerizer is phase separated from the polymer matrix in the composite material.

13. The composite material of claim 11, wherein the corresponding activator comprises a catalyst selected from the group consisting of amines and metal salts.

14. The composite material of claim 11, wherein the corresponding activator comprises a metal salt of a carboxylic acid.

15. The composite material of claim 11, wherein the corresponding activator comprises a tin salt.

16. The composite material of claim 15, wherein the tin salt is a salt of a carboxylic acid.

17. The composite material of claim 11, wherein the adhesion promoter is a silane coupling agent comprising at least one unsaturated group and at least one alkoxy group.

18. The composite material of claim 11, wherein the adhesion promoter is a silane coupling agent selected from the group consisting of (3-acryloxpropyl)-trimethoxysilane, (3-acryloxpropyl)methyldimethoxysilane, methacryloxypropyltrimethoxysilane, methacryloxypropylmethyldimethoxysilane, methacryloxypropyltriethoxysilane, and methacryloxypropylmethyldiethoxysilane.

19. The composite material of claim 11, wherein the polymer matrix comprises at least one member selected from the group consisting of polyamides, polyesters, polycarbonates, polyethers, epoxy polymers, epoxy vinyl ester polymers, polyimides, phenol-formaldehyde polymers, amine-formaldehyde polymers, polysulfones, poly(acrylonitrile-butadiene-styrene), polyurethanes, polyolefins, polyacrylates, poly(alkylacrylates) and polysilanes.

20. The composite material of claim 11, wherein the polymer matrix comprises an epoxy vinyl ester polymer.

21. The composite material of claim 11, wherein the capsules are hollow.

22. The composite material of claim 11, wherein the capsules are particles.

23. A composite material, comprising:
a polymer matrix;
a polymerizer phase comprising a polymerizer; and
a plurality of capsules comprising a corresponding activator for the polymerizer;
where the polymerizer phase is phase separated from the polymer matrix,
the capsules are separate from the polymerizer phase,
the capsules isolate the corresponding activator from the polymerizer until a crack in the composite material intersects at least a portion of the capsules and at least a portion of the polymerizer phase, and
the polymer matrix comprises an epoxy vinyl ester polymer.

24. The composite material of claim 23, wherein the polymerizer comprises at least one member selected from the group consisting of acrylates, alkylacrylates, styrenes, isoprene, butadiene, olefins, cyclic olefins, vinyl ethers, epoxides, lactones, lactams, and functionalized siloxanes.

25. The composite material of claim 23, wherein the polymerizer comprises at least one functionalized siloxane.

26. The composite material of claim 23, wherein the corresponding activator is a catalyst.

27. The composite material of claim 26, wherein the catalyst is selected from the group consisting of ROMP catalysts, cyclic ester polymerization catalysts, amines, and metal salts.

28. The composite material of claim 23, wherein the capsules have an aspect ratio of 1:1 to 1:2, and an average diameter of 10 nm to 1 mm.

* * * * *